Aug. 1, 1967   C. L. LEBLANC ETAL   3,333,709
DISPLAY RACK WITH STORAGE AREA
Filed July 28, 1965
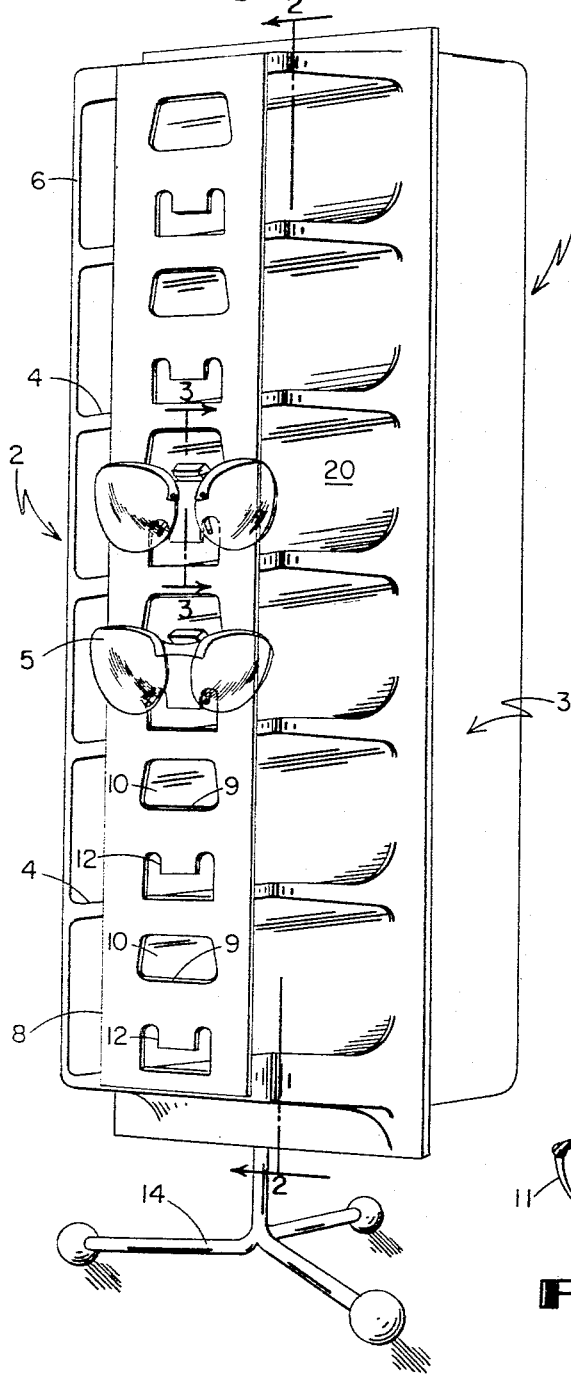
FIG. 1
FIG. 3
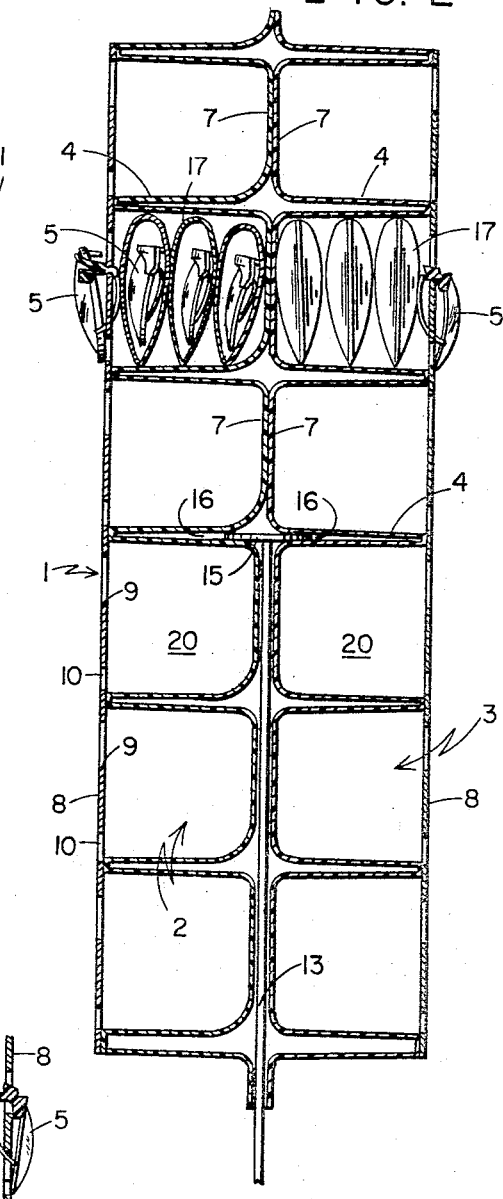
FIG. 2
INVENTORS.
CONRAD L. LEBLANC
and JACK BLOCH
BY *Patrick L. Henry*
ATTORNEY.

United States Patent Office 3,333,709
Patented Aug. 1, 1967

3,333,709
DISPLAY RACK WITH STORAGE AREA
Conrad L. Leblanc and Jack Bloch, Leominster, Mass., assignors to Foster Grant Co., Inc., Leominster, Mass., a corporation of Delaware
Filed July 28, 1965, Ser. No. 475,414
7 Claims. (Cl. 211—13)

This invention relates to a display rack, and more particularly to a display rack with a storage area.

This invention is especially adapted for use as a display rack for sunglasses, particularly the clip-over type of sunglasses which are adapted to be placed over prescription glasses. The invention comprehends the use of a storage rack which is economically manufactured and assembled. The rack provides a display surface and a storage area so as to enable purchased glasses to be removed from the storage pockets behind the display area without disturbing the glasses on display. While the presently preferred embodiment is exemplified as a display rack for sunglasses of the clip-over type, it will be apparent that the display rack of this invention may be used in conjunction with other articles having similar characteristics.

It is therefore an object of this invention to provide a novel storage and display rack which is compact and economical of manufacture.

Another object of this invention is to provide a display rack having storage shelves bounded on one side by a display member which displays the article to be merchandised while at the same time forming a retaining wall for the storage shelf.

A further object of this invention is to provide a display rack comprising two identical sections bonded back to back.

A further object of this invention is to provide a display rack comprising at least two sections bonded together and being supported on a rod having a horizontal member thereon which extends into the shelf portions of the rack to support the rack and retain it against axial movement with respect to the support rod.

The foregoing and other objects are achieved in a display rack with one or more shelves having a display member attached to the front edges thereof. The shelves and the display member form a pocket for the storage of sunglasses, while the display member supports the glasses for display. In the presently preferred embodiment the rack is formed of two identical molded plastic sections. These sections are then glued together in back to back relationship to form a two sided display rack. These sections are supported on a rod having a member disposed transversely thereof, and extending into the shelf portions of the rack to support the rack against axial movement with respect to the rod. In this manner, an economical compact rack is provided for the display and storage of sunglasses and the like.

By the above outlined device, several advantages are obtained. The display rack is quickly and economically manufactured and assembled. A compact display stand is provided which facilitates the display and storage of clip-on sunglasses and the like. The excess glasses are stored immediately behind the display glasses so that purchased glasses may be readily removed without disturbing the displayed glasses.

Other objects and features of the invention will become apparent by reference to the following specification and drawings of the presently preferred embodiment.

In the drawings:

FIG. 1 is a perspective view of the display stand showing glasses in place on the display member and the pockets formed in the stand.

FIG. 2 is a cross section on lines 2—2 of FIG. 1 showing the storage pockets on both sides of the stand and the mechanism for supporting the rack.

FIG. 3 is a cross section taken on lines 3—3 of FIG. 1 showing a pair of sunglasses in position on the display member.

The display rack 1 comprises two identical storage sections 2 and 3 which are bonded back to back to form a two sided display rack. Since the two sections are identical, only one side will be described in detail, it being understood that like numerals refer to like parts in each section.

Each section 2 and 3 comprises a series of shelves 4 which are slightly inclined to the horizontal to aid in maintaining the glasses 5 in the shelves 4. The shelves 4 are formed in the sections 2 and 3 and extend forwardly from back portion 7. The shelves are also bounded on one side by wall or side portion 6 and on the front by display member 8. The back and side walls 6, 7, and shelf 4, and display member 8 thus form a storage pocket 20 for the excess glasses, while the glasses to be displayed are supported on the display member 8.

The display member 8 is preferably of sheet material, and includes holding means including support ledges 9 for supporting the glasses which are slipped onto the member 8 by sliding the glasses through opening 10 so that the clips 11 of glasses 5 are behind the support ledge 9. The glasses are maintained in position on the display member by a stabilizing projection 12 which is straddled by the clips 11 of the glasses 5. This precludes the glasses from accidentally being shifted or dislocated with respect to the display member 8.

The stand is assembled by bonding the two sections 2 and 3 together so that they sandwich between them the support rod 13 of base 14. On the rod 13 is a flat retaining member 15 extending transversely of the rod. This member 15 fits into one of the spaces 16 formed on the inside of the shelf members 4 when the sections 2 and 3 are bonded together. The base 14 and rod 13, together with member 15 thus support the display rack and prevent axial movement of the rack relative to base 14.

In operation the display stand is filled with glasses 5. Part of the glasses are supported on the display members 8 and the remainder thereof are inserted with or without carrying cases 17 into the pockets 20 behind the display member. A buyer desiring to purchase a pair of sunglasses displayed on the display member 8 has merely to remove a pair of glasses with its carrying case from the storage pocket 20. In this way the display is generally not disturbed by the purchase of a pair of glasses. Alternatively, when a pair of glasses 5 is removed from display sheet 8, it can be replaced by a pair from storage pocket 20.

As is apparent from the drawings and the above specification, a display rack has been provided which is easily and economically manufactured and which facilitates the display and storage of numerous articles on a relatively small rack.

The foregoing description is to be considered exemplary rather than limiting; and the scope of the invention is to be determined from the appended claims.

What is claimed is:

1. A merchandising display stand for clip-on type sunglasses comprising:

a base member;

a support rod upstanding from said base member;

a substantially flat retaining member mounted adjacent the top of said support rod and extending transversely thereof;

a pair of identical molded thermoplastic storage sections which are attached back to back;

said storage sections each consisting of a back portion with shelves projecting outwardly from said back portion, and a side portion closing off one side of the shelf portions;

said support rod and retaining member being sandwiched between said storage sections with the retaining member extending into hollow portions formed in the interior of said shelves, whereby said storage sections are restrained against axial movement on said support rod;

a vertically extending sheet member attached to the front edges of the shelf members, whereby the back portion, the shelves, the side portion and the sheet member form a storage pocket opening at the side of each section opposite said side portion;

said sheet member including a series of means for holding sunglasses;

whereby sunglasses may be displayed on the sheet member and stored in the pockets formed by said sheet member, the shelves, the back portions and the side portion of the storage sections.

2. A merchandising display stand for clip-on type sunglass comprising:

a pair of identical molded thermoplastic storage sections which are attached back to back;

said storage sections each consisting of a back portion with shelves projecting outwardly from said back portion, and a side portion closing off one side of the shelf portions;

a vertically extending sheet member attached to the front edges of the shelf members, whereby the back portion, the shelves, the side portion and the sheet member form a storage pocket opening at the side of each section opposite said side portion;

said sheet member including a series of means for holding sunglasses;

whereby sunglasses may be displayed on the sheet member and stored in the pockets formed by said sheet member, the shelves, the back portions and the side portions, and means mounting the section on a base.

3. A merchandising display stand for clip-on type eyeglasses comprising:

a base member;

a support rod upstanding from said base member;

a substantially flat retaining member mounted adjacent the top of said support rod and extending transversely thereof;

a pair of identical molded thermoplastic storage sections which are attached back to back;

said storage sections each consisting of a back portion with shelves projecting outwardly from said back portion, and a side portion closing off one side of the shelf portions;

said support rod and retaining member being sandwiched between said storage sections with the retaining member extending into hollow portions formed in the interior of said shelves, whereby said storage sections are restrained against axial movement on said support rod;

a vertically extending sheet member attached to the front edges of the shelf members, whereby the back portion, the shelves, the side portion and the sheet member form a storage pocket opening at the side of each section opposite said side portion;

said sheet member including a series of eyeglass holding means;

said holding means each comprising an upper ledge member adapted to support said eyeglasses, and a stabilizing projection located below said ledge member;

the clips of the eyeglasses straddling the stabilizing member whereby the eyeglasses are releasably maintained in a substantially fixed position on said sheet member.

4. A merchandising display stand for articles comprising:

a base member;

a support rod upstanding from said base member;

a substantially flat retaining member mounted adjacent the top of said support rod and extending transversely thereof;

a pair of storage sections which are attached back to back;

said storage sections each consisting of a back portion with shelves projecting outwardly from said back portion, and a side portion closing off one side of the shelf portions;

said support rod and retaining member being sandwiched between said storage sections with the retaining member extending into hollow portions formed in the interior of said shelves, whereby said storage sections are restrained against axial movement on said support rod;

a vertically extending sheet member attached to the front edges of the shelf members, whereby the back portion, the shelves, the side portion and the sheet member form a storage pocket opening at the side of each section opposite said side portion;

said sheet member including at least one article holding means;

whereby articles may be displayed on the sheet member, and also stored in the pockets formed by the sheet member, the shelves, the back portions, and the side portion of the storage sections.

5. A merchandising display stand for articles comprising:

a storage section;

said storage section including a back portion with shelves projecting outwardly therefrom, an end member closing one end of said storage section, said storage section slanting downwardly from the open end towards the closed end;

a display member attached to the front edges of the shelves, whereby the back portion, the shelves and the display member form a storage pocket;

said display member including at least one article holding means;

whereby articles may be displayed on the display member, and also stored in the pockets formed by the display member, the shelves, and the back portion of the storage section.

6. A merchandising display stand for articles comprising:

a base member;

a support rod upstanding from said base member;

a molded thermoplastic storage section mounted on said support rod;

said storage section consisting of a back portion with shelves projecting outwardly from said back portion;

and one side portion closing off one side of the shelf portion, said storage section slanting downwardly from the open end to the closed end;

a vertically extending sheet member attached to the front edges of the shelf members, whereby the back portion, the shelves, the side portion and the sheet member form a storage pocket opening at the side of said section opposite said side portion;

said sheet member including a series of holding means;

whereby articles may be displayed on the sheet member, and also stored in the pockets formed by the sheet member, the shelves, and the back portion of the storage section.

7. A merchandising display stand for articles comprising:
   a base member;
   a support member upstanding from said base member;
   a retaining member mounted on said support member and extending transversely thereof;
   a pair of display sections having shelves and attached back to back;
   said support member and said retaining member being sandwiched between said display sections with the retaining member extending into hollow portions formed in the shelves of said display sections;
   whereby said display sections are restrained against axial movement on said support member.

References Cited

UNITED STATES PATENTS

| | | | |
|---|---|---|---|
| 1,911,678 | 5/1933 | Dunn | 205—44.11 |
| 1,949,376 | 2/1934 | Mansfield et al. | 206—45.14 |
| 2,816,666 | 12/1957 | Nadel | 211—13 |
| 2,936,897 | 5/1960 | Bloch | 211—13 |
| 2,950,155 | 8/1960 | Schick | 312—202 |

ROY D. FRAZIER, *Primary Examiner.*

CLAUDE A. LE ROY, *Examiner.*

W. D. LOULAN, *Assistant Examiner.*